United States Patent [19]
Ta et al.

[11] Patent Number: 5,390,772
[45] Date of Patent: Feb. 21, 1995

[54] SWITCHABLE HIGH SPEED FROG MECHANISM

[75] Inventors: Cuong M. Ta, Taylors; Randel C. Anderson, Greer, both of S.C.

[73] Assignee: Westinghouse Air Brake Co., Wilmerding, Pa.

[21] Appl. No.: 92,643

[22] Filed: Jul. 16, 1993

[51] Int. Cl.⁶ ............................. E01B 7/10; B60M 1/14
[52] U.S. Cl. ................................. 191/38; 246/419; 246/460; 246/462
[58] Field of Search ............... 191/37, 38; 246/418, 246/419, 460, 462

[56] References Cited

U.S. PATENT DOCUMENTS

| | | | |
|---|---|---|---|
| 473,362 | 4/1892 | Short | 191/38 |
| 1,252,400 | 1/1918 | Coalson | 246/460 |
| 1,534,178 | 4/1925 | Hoffman | 246/460 |
| 2,099,494 | 11/1937 | Matthes | 191/38 |
| 2,299,914 | 10/1942 | Matthes | 191/38 |
| 2,316,441 | 4/1943 | Lewis | 191/37 |
| 2,359,437 | 10/1944 | Matthes | 191/38 |
| 2,360,064 | 10/1944 | Lewis | 191/38 |
| 2,393,388 | 1/1946 | Lewis | 191/38 |
| 2,494,409 | 1/1950 | Richterkessing | 191/38 |
| 2,710,316 | 6/1955 | George | 246/419 X |

FOREIGN PATENT DOCUMENTS

| | | | |
|---|---|---|---|
| 256755 | 3/1949 | Germany | 191/37 |
| 516323 | 12/1939 | United Kingdom | 191/37 |
| 546314 | 7/1942 | United Kingdom | 191/38 |

Primary Examiner—Michael S. Huppert
Assistant Examiner—Scott L. Lowe
Attorney, Agent, or Firm—John B. Sotak

[57] ABSTRACT

A high speed frog including a ductile iron main pan casting having an integral straight approach runner, an integral straight exit runner, and an integral exit turnout runner, a movable runner having a pair of guide rails, an electric solenoid for rotating the movable runner so that one of said pair of guide rails is cooperatively associated with the stationary runner, diverts a sliding contact shoe to the turn-out runner, a mechanical deflector engageable for resetting the movable runner so that the other of the pair of guide rails engages the integral straight approach runner, and a renewable runner insert disposed between integral straight approach runner and the respective guide rails of the movable runner.

15 Claims, 4 Drawing Sheets

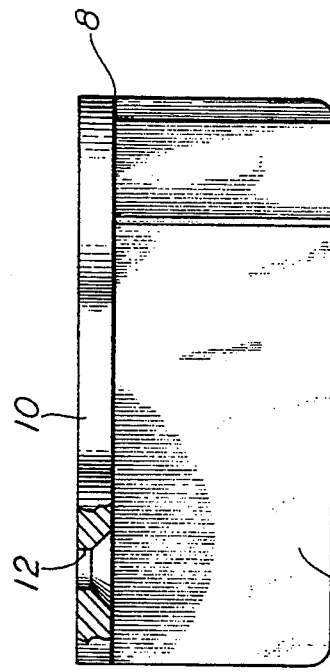
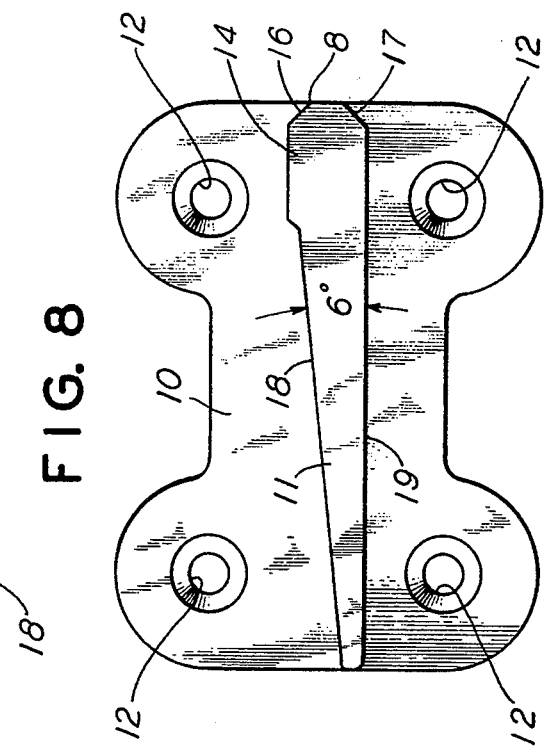
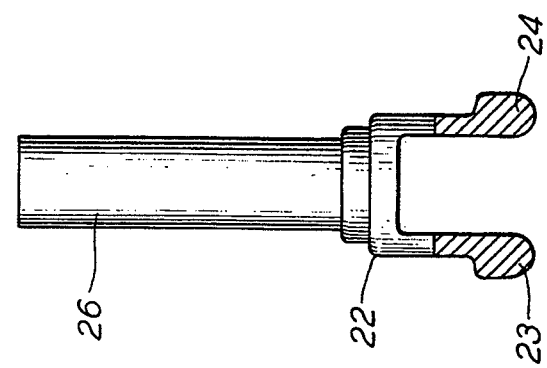

SWITCHABLE HIGH SPEED FROG MECHANISM

FIELD OF THE INVENTION

This invention relates to a high speed frog for controlling the movement of a trolley pole of a trolley coach or a light rail vehicle, and more particularly, to an electromechanically operated overhead trolley frog having a low turn-out angle for high speed operation and having a renewable runner insert located between the movable and stationary runners which can be easily removed and replaced when the existing runner insert experiences excessive wear or is damaged which eliminates the need of removing and discarding the entire main pan casting as was the case in previous frog installations.

FIELD OF THE INVENTION

In electrical trolley line systems, it is necessary to provide some type of power-operated switching mechanism at certain locations along the route of travel of the vehicle wherein the operator may be required to deviate to the right or left as he proceeds toward his scheduled destination. In the past, electrically-operated frogs were generally employed to switch a pair of movable runners to establish the selected route of travel so that the trolley pole would follow the course of the trolley bus. Normally, the frog included a main pan casting upon which was mounted the movable runners, the electrical operator, and the electrical connectors which were connected to the conductors of the trolley bus overhead system. Previously, the lead-in runner was integrally formed on the main pan casting so that the whole casting had to be discarded when the lead-in runner became badly or excessively worn out. This entailed removal of the entire trolley frog from the overhead trolley wire system. The components of the frog could be rebuilt on a new main pan casting or the complete worn frog could be replaced by an entirely new trolley frog. In either case, this was both costly and time consuming. In addition, the transition between the movable and stationary runners was rough and erratic due to the large gaps and uneven alignment of the movable and fixed runners of the previous frogs. Further, the turn-out angle was relatively large, namely, twelve degrees (12°) or more, in the foregoing trolley frogs. Both of these previous shortcomings tend to limit usage of these existing trolley frogs to relatively low speed trolley bus operations.

OBJECTS AND SUMMARY OF THE INVENTION

Accordingly, it is an object of the invention to provide a new and improved high speed frog for trolley bus systems.

Another object of the invention is to provide a unique overhead trolley bus frog having a low turn-out angle for accommodating high speed trolley operations.

A further object of this invention is to provide a switchable high speed frog having a replaceable runner insert interposed between the movable and stationary runners of an overhead trolley system.

Yet another object of this invention is to provide an electro-mechanically operated high speed frog mechanism which permits smooth ingress and egress of an electrical contact shoe of a trolley pole.

Yet a further object of this invention is to provide an improved high speed frog having a renewable runner insert which may be quickly and easily removed and replaced without disturbing the main pan casting.

Still another object of this invention is to provide an electrically operated high speed frog arrangement including a removable insert having a tapered runner for providing a smooth transition between the movable and stationary runners of a trolley contact system.

Still a further object of this invention is to provide a high speed frog comprising, a main pan casting having a stationary entrance runner and stationary mainline and turn-out runners, a movable runner having a pair of guide rails, an electrical operator for activating the movable runner so that one of the pair of guide rails is cooperatively associated with the stationary entrance runner and diverts a contact shoe to the turn-out runner, a mechanical deflector engageable by the contact shoe for resetting the movable runner so that the other of the pair of guide rails engages the stationary entrance runner, and a renewable runner insert disposed between the stationary entrance runner and the respective guide rails of the movable runner.

An additional object of this invention is to provide an improved high speed frog which is simple in design, economical in cost, efficient in operation, durable in service, reliable in use, unique in construction, and easy to maintain.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 5 is a sectional view taken along line V—V of FIG. 3.

FIG. 6 is a sectional view taken along line VI—VI of FIG. 3.

FIG. 7 is an enlarged plan view taken from the underside of the renewable runner insert which is interposed between the straight stationary runner and the movable deflector running of the high speed frog of FIGS. 1 and 2.

FIG. 8 is a side elevational view of the renewable runner insert of FIG. 7.

DETAILED DESCRIPTION OF THE INVENTION

Figure 1:
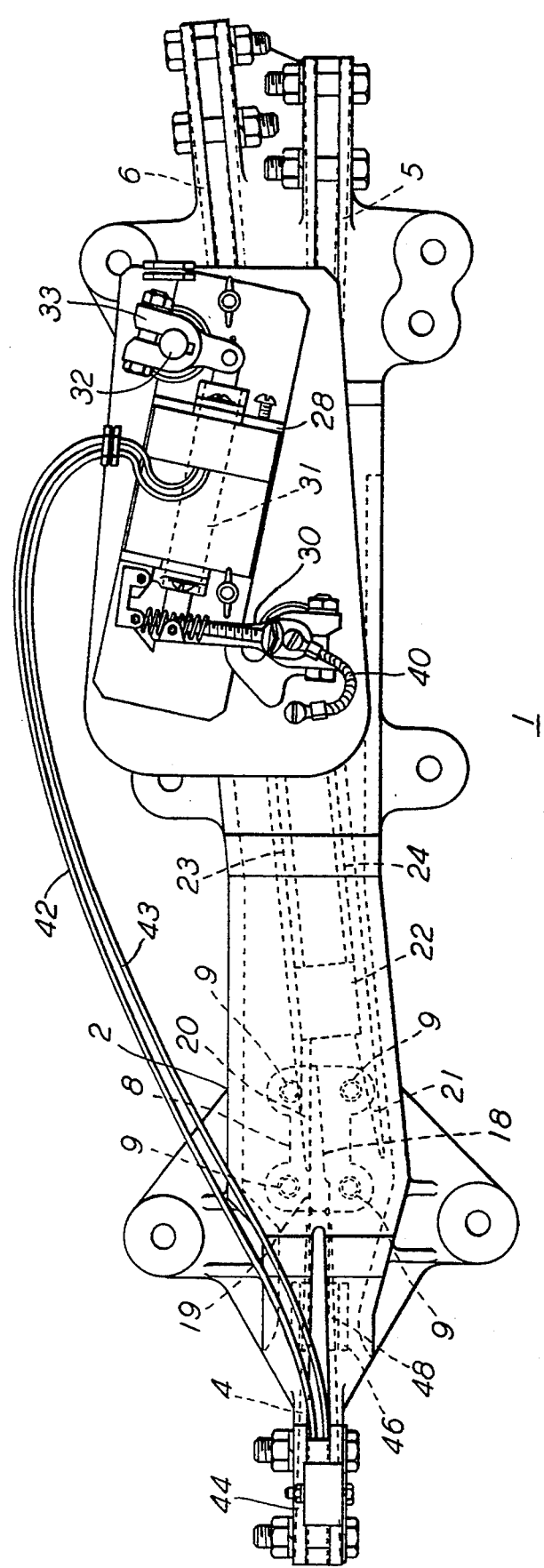
FIG. 1 is a top plan view of a left-hand turn-out electrically operated high speed frog having a renewable insert interposed between the movable and stationary runners of a trolley pickup system in accordance with the present invention.

Referring now to the drawings, and in particular to FIG. 1, there is shown an electromechanically actuated high speed frog assembly generally characterized by numeral 1. It will be seen that the electrically solenoid operated frog 1 is conveniently illustrated as a left-hand turn-out arrangement for a trolley pole of a trolley coach or bus system at the point or location where the routes of travel diverge in different directions. As shown, the frog 1 includes a main pan casting 2 which is adapted to be securely attached in a suitable manner, such as, being bolted to the overhead structure of the electrical trolley conductor system at the diverging points or locations in the route of travel of electric powered vehicles. It will be noted that the pan casting 2 which is preferably cast of ductile iron includes a plurality of stationary or fixed runners 4, 5 and 6 integrally formed on the underside thereof. That is, as shown in FIG. 1, the left end of the pan assembly 2 includes a straight route extending ductile iron approach runner 4 while the right end of the pan assembly 2 includes a straight route ductile iron runner 5 and a turn-out route ductile iron runner 6.

It will be seen that disposed in alignment with the normally exiting end of the runner 4 is a renewable runner insert 8 which is fixedly secured to the underside of the pan casting 2 by four flat head screws 9 and four suitable lock washers and nuts (not characterized). As shown in greater detail in FIGS. 7 and 8, the renewable runner insert 8 is preferably a stainless steel investment casting having an upper flat mounting plate portion 10 and an integral extending running blade portion 11. It will be noted that the mounting plate member 8 includes four countersink holes 12 for accommodating the threaded end of the four flat-head screws 9.

Figure 2:
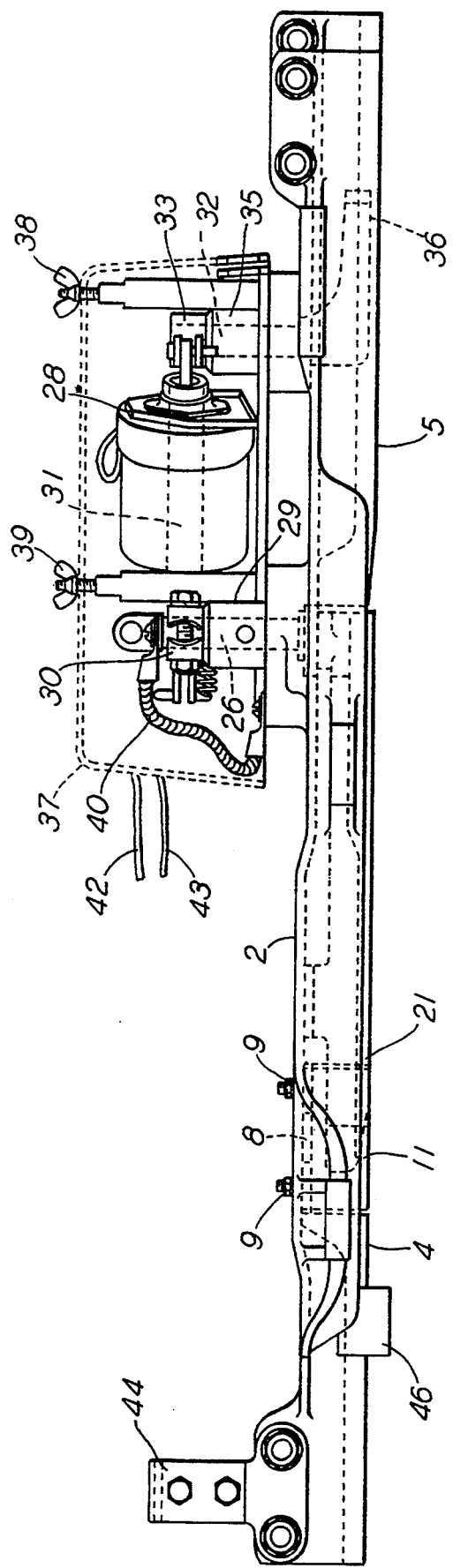
FIG. 2 is a side elevational view of the electrically operable frog of FIG. 1.
Figure 3:
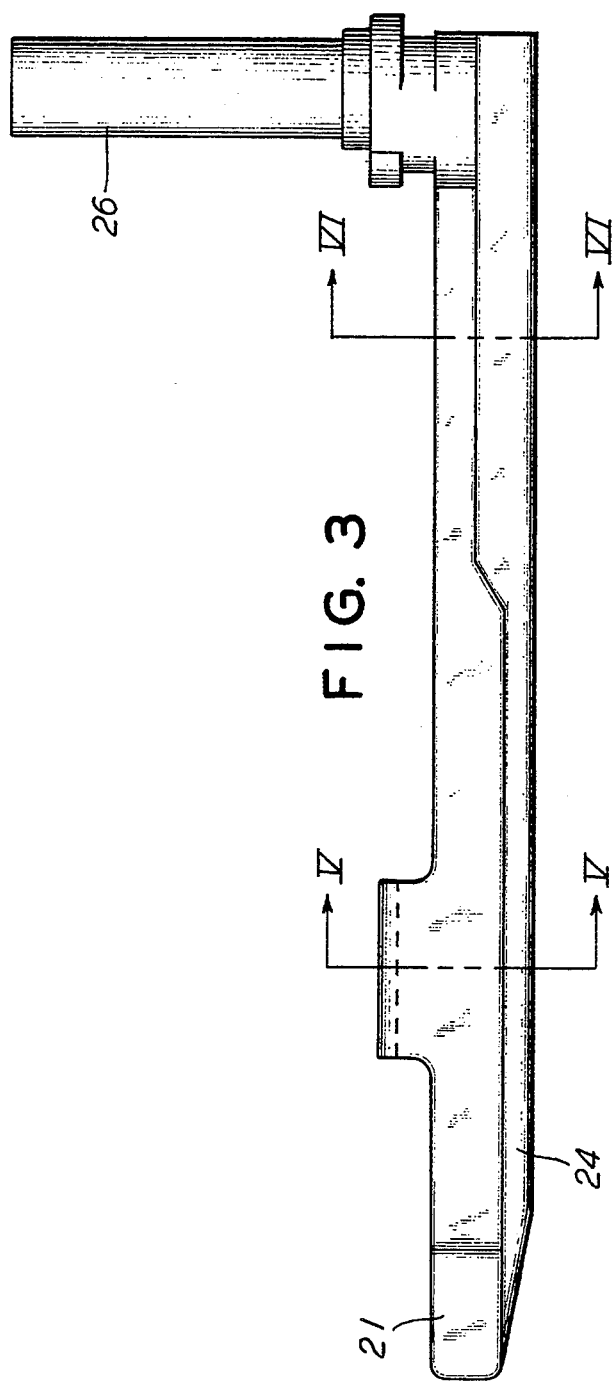
FIG. 3 is a side elevational view of the movable contact runner of the frog of FIGS. 1 and 2.
Figure 4:
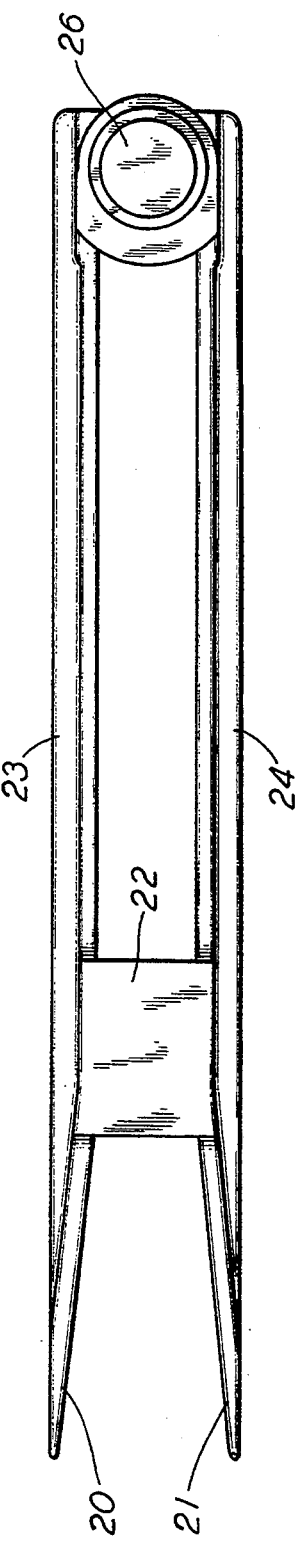
FIG. 4 is a top plan view of the movable runner of FIG. 3.

In practice, the renewable runner insert 8 spans a gap located between the adjacent end of the straight approach runner 4 and a pair of movable runners as will be described presently. In viewing FIGS. 1 and 7, it will be seen that the running blade 11 is disposed next to the end of stationary runner 4 and has a heel portion 14 which has a thickness substantially equal to the thickness of the stationary runner 4. As shown in FIG. 2, the bottom or lower edge or lower surface of the runner 11 is at the same level as the bottom edge or lower surfaces of the stationary runner 4 and the movable runner 22 so that a contact shoe will pass smoothly thereover. Both corners of the left-hand end of the heel portion 14 are chamfered to remove any burrs or rough edges as shown by beveled portions 16 and 17 in FIG. 7. Also, the beveled corners permit a greater latitude in the tolerances and allowances in the dimensional width of the entrance runner 4 and provide for the smooth transition of the U-shaped carbon contact shoe assembly 46. It will be seen that the front or toe portion of the running blade 11 is tapered on one side 18 which is left-hand frog assembly. It will be appreciated that the right-toe end of the running blade 11 is tapered for a left-hand turn-out frog assembly. In practice, the angle between the tapered surface 18 and the straight surface 19 is approximately six degrees (6°).

As shown in FIGS. 1 and 2, the tapered toe portion of the running blade 11 is selectively engageable by the tapered tips 20 and 21 of a movable runner 22. The movable runner 22 includes a turn-out running rail 23 and a straight running rail 24. In viewing FIGS. 2, 3, 4, and 6, it will be noted that a pivot pole or rotatable shaft 26 is integrally formed on the remote end of the movable runner 22. The pivot shaft 26 is adapted to be rotated above its axis by an electrical solenoid operator 28 which is suitably mounted on the main pan casting 2. As shown in FIG. 2, the upper end of the shaft 26 is inserted into a boss 29 threaded on the pan casting 2. Next, the one bifurcated end of an operating lever 30 is firmly attached to the upper free end of the shaft 26. The other remote end of lever 30 is pivotally connected to one end of a movable plunger 31 of the solenoid 28.

It will be seen that the other end of the solenoid plunger 31 is pivotally connected to the free end of a pivot shaft 32 of a rotatable reset lever 33. The pivotal shaft 32 is rotatable in a boss 35 which is threaded on the pan casting 2. A deflector arm or plate 36 is an integral part of the reset lever 33. The deflector arm 36 is disposed adjacent the turn-out runner 6 so that the movable runner 22 is reset to its straight position by the passing trolley contact shoe assembly 46 which may take the form of a bronze carrier member which holds a carbon insert member 48 having a U-shaped groove which follows the electrified trolley wire and the various runners of the frog assembly. In practice, the shoe assembly may be similar to that shown and disclosed in U.S. Pat. No. 4,567,335, entitled "High Speed Trolley Harp Assembly" to Thomas W. Griffiths. A protective cover 37, shown in phantom, encloses the solenoid operator 28 and the other associated components and is held in place by a pair of wing nuts 38 and 39. It will be appreciated that the movable runner 22 is supplied with electric propulsion current via a shunt wire 40. Normally, the tip of the straight running rail 21 engages the tapered side of the running blade 11 so that the trolley contact shoe assembly 46 moves from stationary entrance runner 4, along the running blade 11 and the movable running rail 24 to the stationary straight exit runner 5 as the trolley bus moves along the main route of travel.

Now when it is desired to divert an oncoming trolley bus, the operator simply activates the turn signal which causes the energization of the coil of the electromagnetic solenoid 28 via leads 42 and 43. As shown in FIGS. 1 and 2, the leads 42 and 43 are held in spaced relationship by an insulative wire support member 44 which is mounted on the front end of the pan casting assembly 2. The energized solenoid 28 attracts and pulls the plunger 31 outwardly which causes the lever 30 to move in a counterclockwise direction. The counterclockwise rotation, in turn, is imparted to shaft 26 which causes the movable runner 22 to shift so that the tapered tip 20 of movable running rail 23 is moved against the surface 19 of running blade 11. The movement of the plunger 31 to the left also causes the reset lever 33 to rotate in a clockwise direction. The clockwise motion of the reset lever 33 is also conveyed to shaft 32 so that the mechanical reset deflector arm 36 is moved against the side of the turn-out runner 6. The solenoid coil of electromagnet 28 is deenergized after a few seconds of energization by a separate timer supplied by other vendors. It will be appreciated that the high speed frog will remain the position as shown in FIG. 1 because of the over-the-center spring biasing arrangement. Now when the trolley contact shoe assembly 46 engages the deflector arm 36, a counterclockwise rotation is imparted to the reset lever 33 which moves the plunger 31 to the right. The rightward movement of the plunger 31 rotates the lever 30 in a clockwise direction which, in turn, rotates the pivotal shaft 26 and shifts the movable runner 22 so that the tapered tip 21 of the running rail 24 moves against the tapered surface 18 of the running blade 11. Thus, the high speed frog 2 resumes its normal position in which the sliding trolley contact shoe follows the trolley bus as it proceeds along the main route of travel.

As previously mentioned, the turn-out angle is only six degrees (6°) and the smooth transition between the stationary and movable runners permits the trolley buses to negotiate the frog 2 at a relatively high rate of speed. Thus, the high speed frog 1 minimizes the chance of derailment of the trolley contact shoe and the loss of power to the trolley bus. Further, the use of the runner insert 8 in the high speed frog 1 eliminates the electrical arcing and erosion due to the momentary power interruptions caused by the discontinuities between the movable and stationary runners. Hence, the elimination of the gaps between the movable and stationary runners substantially reduces wear and damage to the trolley contact or power pickup shoe as well as alleviates the whipping and sideways movement of the trolley pole.

Thus, the present invention has been described in such full, clear, concise and exact terms as to enable any person skilled in the art to which it pertains to make and use the same, and having set forth the best mode contemplated of carrying out this invention. We state that the claimed subject matter, which we regard as being our invention, is particularly pointed out and distinctly set forth in this application. It will be understood that variations, modifications, equivalents and substitutions for components of the above specifically-described embodiment of the invention may be made by those skilled in the art without departing from the spirit and scope of the invention as set forth in the appended claims.

What we claim is:

1. A high speed frog comprising, a main pan casting having a stationary entrance runner and stationary mainline and turn-out runners, a movable runner having a pair of guide rails, an electrical operator for actuating said movable runner so that one of said pair of guide rails is cooperatively associated with the stationary entrance runner and diverts a contact shoe to the turn-out runner, a mechanical deflector engageable by the contact shoe for resetting said movable runner so that the other of said pair of guide rails engages said stationary entrance runner, and a renewable runner insert disposed between said stationary entrance runner and said pair of guide rails of said movable runner.

2. The high speed frog as defined in claim 1, wherein said electrical operator is an electromagnetic solenoid.

3. The high speed frog as defined in claim 1, wherein said renewable runner insert includes a flat mounting plate which is secured to the underside of said main pan casting.

4. The high speed frog as defined in claim 1, wherein said renewable runner insert is a stainless steel investment casting member.

5. The high speed frog as defined in claim 1, wherein said renewable runner insert is removably attached to the underside of said main pan casting.

6. The high speed frog as defined in claim 1, wherein said contact shoe includes a U-shaped carbon insert.

7. The high speed frog as defined in claim 6, wherein said U-shaped carbon insert is carried by a metal carrier.

8. The high speed frog as defined in claim 1, wherein said renewable runner insert includes a tapered running blade which spans a gap located between the stationary entrance runner and said movable runner.

9. The high speed frog as defined in claim 8, wherein said pair of guide rails each have a tapered tip portion which engage said tapered running blade and provide a smooth transition between said stationary entrance and said movable runner.

10. The high speed frog as defined in claim 9, wherein said stationary entrance runner and said turn-out runner extend in tangential directions having an angle therebetween of approximately six degrees (6°).

11. The high speed frog as defined in claim 1, wherein said electrical operator includes a solenoid coil and a movable plunger for rotating said movable runner.

12. The high speed frog as defined in claim 11, wherein one end of said movable plunger is connected to a pivotal lever for rotating said movable runner in engagement with said turn-out runner.

13. The high speed frog as defined in claim 12, wherein said movable runner includes a rotatable shaft connected to said pivotal lever.

14. The high speed frog as defined in claim 12, wherein the other end of said movable plunger is connected to another pivotal lever for rotating said mechanical deflector in engagement with said turn out runner.

15. The high speed frog as defined in claim 14 wherein said mechanical deflector includes a rotatable shaft connected to said another pivotal shaft.

* * * * *